UNITED STATES PATENT OFFICE.

FRITZ KLATTE, OF SCHWANHEIM-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

MANUFACTURE OF ESTERS AND ETHERS OF ETHYLIDENE GLYCOL AND OF VINYL ALCOHOL.

1,084,581.  Specification of Letters Patent. Patented Jan. 13, 1914.

No Drawing.   Application filed August 26, 1913.  Serial No. 786,760.

*To all whom it may concern:*

Be it known that I, FRITZ KLATTE, a subject of the German Emperor, and resident of Schwanheim-on-the-Main, Germany, have invented certain new and useful Improvements in the Manufacture of Esters and Ethers of Ethylidene Glycol and of Vinyl Alcohol, of which the following is a specification.

Hitherto esters and ethers of the hypothetic ethylidene glycol have been produced by causing acetaldehyde and acid anhydrids to react on one another. Thus for instance the di-ester of acetic acid, the ethylidene di-acetate

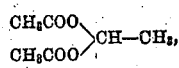

is obtained by heating acetaldehyde with acetic anhydrid at 180° centigrade (Geuther, *Annal* 106, 249), or in accordance with Wegscheider and Späth (*Chem. Centralblatt*, 1910 I, 1421) whose process consists in causing the formation of the ester at a lower temperature by the aid of a trace of sulfuric acid added to the mixture of acetaldehyde and acetic anhydrid, or in accordance with Wohland and Nagg, (*Chem. Centralblatt* 1911 I, 10) with a still better yield, by operating with an excess of acetaldehyde. Of the ether-like compounds, for instance the acetalglycerin (acetaldehyde glycerin, acetoglycerol)

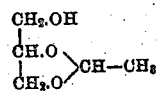

has been prepared by Neef (*Chem. Centralblatt*, 1904 II, 1201) by heating glycerin with acetaldehyde at from 160° to 200° centigrade.

I have now found that bodies containing hydroxyl and carboxyl groups combine with acetylene to a remarkable extent if the acetylene be passed through the said bodies when moderately heated and briskly stirred and when the operation is carried out in the presence of a suitable carrier such, for instance, as a salt of mercury (mercury-sulfate, or phosphate, for example) with, or without, other substance capable of acting as a carrier. In this way ethylidene esters, or ethers, are produced mostly in quantitative yield; these compounds being readily and smoothly obtained in accordance with the hitherto unknown reaction in accordance with the formula:

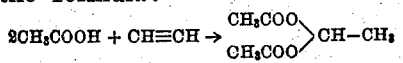

In addition to this main reaction another reaction (also hitherto unknown) takes place when acetylene reacts on acid namely, the formation of vinyl esters by the reaction of one molecular proportion of acid with one molecule of acetylene:

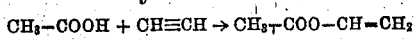

The quantities of the resulting vinyl esters differ with various acids. For instance, in the action of acetylene on tri-chlor-acetic acid, over 60 per cent. of the theoretical yield of vinyl ester is obtained, as against a yield of vinyl acetate equal only up to about 5 per cent. of the theoretical, has hitherto been usually obtained in the manufacture of ethylidene di-acetate. Under special conditions the yields of vinyl esters may be increased. For instance on passing acetylene through a mixture of formic acid and acetic acid in the presence of mercury phosphate, equal parts of vinyl formate (boiling point 44° centigrade) and vinyl acetate (boiling point 72° centigrade) are formed.

The attachment of acetylene to alcohols forming several acids is effected by two hydroxyl groups of one molecular proportion reacting with one molecular proportion of acetylene for instance, in the case of monochlorhydrin;

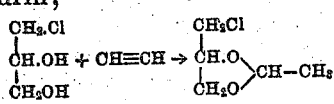

The process in accordance with this invention has the advantage over those already known that it is very economical as, for the purpose of obtaining the esters the cheap carboxylic acids and acetylene are used as initial materials instead of the costly anhydrids and acetaldehyde respectively.

By the new reaction in accordance with this invention it is possible to produce a large number of esters and ethers some already known and some not hitherto known. In the group of the alcohols, I mention especially the di-valent glycols and glycerin and derivatives thereof, for instance, mono-chlorhydrin and acetin, in using which the reaction takes place readily and smoothly. But acetylene can also be attached to the monovalent alcohols such for instance as, iso-amyl alcohol and iso-butyl alcohol, ethylidene-di-isoamyl ether and ethylidene-di-isobutyl ether being thereby obtained. Of the aromatic hydroxyl compounds, phenol and cresol for instance when treated by the same process also absorb large amounts of acetylene; the products resulting from the treatment being difficult to obtain in a pure state. From the group of acids the suitability of the reaction with the following acids has been investigated: acetic acid, propionic acid, mono-, di- and tri-chlor-acetic acids, lactic acid and benzoic acid. In using benzoic acid, it is necessary to use a solvent, acetic acid, for instance, being suitable. In addition to small amounts of ethylidene di-acetate, ethylidene acetate-benzoate and the ethylidene-di-benzoate melting at 73° centigrade are obtained. That other further bodies containing hydroxyl groups react in the same manner with acetylene, is exemplified by the production of the lactic acid nitrile compound. In my investigations regarding the production of all the aforesaid ethylidene and vinyl compounds, I have found that the initiation of the reaction is facilitated; that the reaction can be carried out at a lower temperature and that the proportion of the resulting ethylidene and vinyl compounds can be varied by the addition of a small quantity of catalytically acting substances, such for instance as mineral acid, a sulfonic acid, acid salt, or other analogous body.

The following are examples of how the invention can be performed but I do not limit myself to these examples.

Example 1: 250 grams of anhydrous acetic acid are mixed with 10 grams of mercury sulfate and at a temperature of from 60°, to 100°, centigrade dry acetylene is passed through the mixture while it is rapidly stirred. The velocity of the gas current is so adjusted that no unabsorbed gas leaves the apparatus. When the combination has practically ceased, the reaction product is subjected to fractional distillation *in vacuo*. The unaltered acetic acid which first passes over, contains small amounts of vinyl-acetate and afterward the pure ethylidene-di-acetate distils over, the yield being from 80, to 90 per cent. of the theoretical. The mercury compounds remaining in the distillation residue can be regenerated in a simple manner and re-converted into mercury sulfate.

Example 2: 100 grams of propionic acid are mixed with 3 grams of mercury sulfate, about one cubic centimeter of concentrated sulfuric acid being added. At a temperature of from 60°, to 70°, centigrade the combination of the acetylene takes place. The raw product is treated as described in the preceding example by fractional distillation. The yield of ethylidene propionate amounts to about from 60, to 70, per cent. of theoretical.

Example 3: As described in the foregoing examples, acetylene is caused to react at a temperature of from 60°, to 80°, centigrade on 200 grams of molten trichlor-acetic acid 10 grams of mercury sulfate being added. In a short time about 20 liters, or more, of gas have combined. The reaction product is fractionated *in vacuo*, the vinyl-trichloracetate first passing over. The boiling point of the latter is, at ordinary atmospheric pressure, about 149° centigrade. The yield is from 60, to 70, per cent. of the theoretical.

Example 4: Into 120 grams of iso-butyl-alcohol admixed with 12 grams of mercury sulfate and 1 gram of anhydrous sodium bisulfate, acetylene is introduced at a temperature of from 95°, to 100°, centigrade until the absorption of acetylene has ceased. The reaction product is thereupon distilled off *in vacuo* and fractionated for the purpose of purification of the ethylidene di-isobutyl ether obtained. The yield is from 50, to 60 per cent. of the theoretical.

Example 5: 100 grams of ethylene-glycol are mixed with 10 grams of mercury sulfate and 0.2 cubic centimeters of concentrated sulfuric acid and, at a temperature of from 60°, to 70°, centigrade acetylene is passed through until the absorption of the gas ceases. The resulting ethylene-ethylidene-ether (boiling point 51° centigrade) is distilled at ordinary pressure from the raw product. The yield is from 80, to 90, per cent. of the theoretical.

Example 6: 250 grams of glycerin are mixed with 10 grams of mercury sulfate and acetylene is passed through at a temperature of from 60°, to 70°, centigrade as long as brisk combination of the gas takes place. The reaction mixture is preferably allowed to settle and the supernatant clear liquor is fractionated *in vacuo*. The yield of acetal glycerin is almost quantitative.

Example 7: Into 200 grams of mono-chlorhydrin to which 10 grams of mercury sulfate have been added, acetylene is passed as above at a temperature of from 60°, to 70°, centigrade. The reaction product, is allowed to settle and, from the supernatant liquid, the mono-chlorhydrin ether is separated by fractionation from the small amount of unaltered mono-chlorhydrin. The yield is almost theoretical. The ether boils at 148° centigrade.

It will be seen from the above description that the acetylene combines with the hydroxyl groups of the alcohols or carboxylic acids to form additional compounds, these compounds being esters when the acetylene combines with the hydroxyl group of the carboxylic acids, and ethers when the combination takes place with the alcohol or glycol hydroxyl groups.

What I claim is:

1. The process of combining acetylene with organic compounds containing hydroxyl groups which comprises reacting with acetylene on said compounds in the presence of a mercury salt.

2. The process of combining acetylene with organic compounds containing hydroxyl groups which comprises reacting with acetylene on said compounds while moderately heated and agitated and in the presence of a mercury salt.

3. The process of combining acetylene with organic compounds containing hydroxyl groups which comprises reacting with acetylene on said compounds in the presence of a mercury salt and another substance capable of promoting the reaction.

4. The process of combining acetylene with organic compounds containing hydroxyl groups which comprises reacting with acetylene on said compounds while moderately heated and agitated and in the presence of a mercury salt and another substance capable of promoting the reaction.

5. The process of combining acetylene with organic compounds containing hydroxyl groups which comprises reacting with acetylene on said compounds in the presence of mercury sulfate.

6. The process of combining acetylene with organic compounds containing hydroxyl groups which comprises reacting with acetylene on said compounds while moderately heated and agitated and in the presence of mercury sulfate.

7. The process of forming esters of carboxylic acids which comprises reacting with acetylene on said acids in the presence of a mercury salt.

8. The process of forming esters of carboxylic acids which comprises reacting with acetylene on said acids while moderately heated and agitated and in the presence of a mercury salt.

9. The process of forming esters of carboxylic acids which comprises reacting with acetylene on said acids in the presence of a mercury salt and another substance capable of promoting the reaction.

10. The process of forming esters of carboxylic acids which comprises reacting with acetylene on said acids while moderately heated and agitated and in the presence of a mercury salt and another substance capable of promoting the reaction.

11. The process of forming esters of carboxylic acids which comprises reacting with acetylene on said acids in the presence of mercury sulfate.

12. The process of forming esters of carboxylic acids which comprises reacting with acetylene on said acids while moderately heated and agitated and in the presence of mercury sulfate.

13. The process of producing derivatives of ethylidene glycol which comprises reacting with acetylene on organic compounds containing hydroxyl groups in the presence of a mercury salt, said compounds and acetylene being used in proportions to combine one molecule of acetylene with two hydroxyl groups of said compounds.

14. The process of producing derivatives of ethylidene glycol which comprises reacting with acetylene on organic compounds containing hydroxyl groups in the presence of a mercury salt, said compounds being moderately heated and agitated, and said compounds and acetylene being used in proportions to combine one molecule of acetylene with two hydroxyl groups of said compounds.

15. The process of forming ethylidene derivatives of fatty acids which comprises reacting with acetylene on said acids in the presence of a mercury salt.

16. The process of forming ethylidene derivatives of fatty acids which comprises reacting with acetylene on said acids while moderately heated and agitated and in the presence of a mercury salt.

17. The process of forming ethylidene derivatives of fatty acids which comprises reacting with acetylene on said acids in the presence of a mercury salt and another substance capable of promoting the reaction.

18. The process of forming ethylidene derivatives of fatty acids which comprises reacting with acetylene on said acids while moderately heated and agitated and in the presence of a mercury salt and another substance capable of promoting the reaction.

19. The process of forming ethylidene derivatives of fatty acids which comprises reacting with acetylene on said acids in the presence of mercury sulfate.

20. The process of forming ethylidene derivatives of fatty acids which comprises reacting with acetylene on said acids while moderately heated and agitated and in the presence of mercury sulfate.

In testimony whereof I have signed my name to this specification in the presence of two subscribing witnesses.

FRITZ KLATTE.

Witnesses:
 JEAN GRUND,
 ELSE MEBUS.